United States Patent
Huang et al.

(10) Patent No.: US 10,348,162 B1
(45) Date of Patent: Jul. 9, 2019

(54) METHOD AND ASSEMBLY OF AN ELECTRIC MACHINE

(71) Applicant: GE AVIATION SYSTEMS, LLC, Grand Rapids, MI (US)

(72) Inventors: Hao Huang, Troy, OH (US); John S. Mears, Cincinnati, OH (US); Xiaochuan Jia, Centerville, OH (US); Samuel Robert Hathaway, Cincinnati, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 4 days.

(21) Appl. No.: 15/850,719

(22) Filed: Dec. 21, 2017

(51) Int. Cl.
*F02C 7/32* (2006.01)
*H02K 7/18* (2006.01)
*H02K 9/19* (2006.01)

(52) U.S. Cl.
CPC ............... *H02K 9/19* (2013.01); *F02C 7/32* (2013.01); *H02K 7/1823* (2013.01); *F05D 2220/7642* (2013.01); *F05D 2220/7644* (2013.01)

(58) Field of Classification Search
USPC ......... 290/52; 415/122.1; 62/310; 123/559.1
See application file for complete search history.

(56) References Cited

U.S. PATENT DOCUMENTS

| | | | |
|---|---|---|---|
| 3,248,880 A | 5/1966 | Hull, Jr. et al. | |
| 3,299,738 A * | 1/1967 | Sand | F16H 41/30 418/27 |
| 5,034,638 A | 7/1991 | McCabria | |
| 5,193,352 A * | 3/1993 | Smith | F02C 7/143 62/201 |
| 6,640,575 B2 * | 11/2003 | Word | F28D 5/00 165/133 |
| 7,458,369 B2 * | 12/2008 | Ozawa | F01D 25/20 123/559.1 |
| 7,591,147 B2 | 9/2009 | Masoudipour et al. | |
| 7,765,827 B2 * | 8/2010 | Schlom | F24F 5/0007 62/309 |
| 7,984,606 B2 | 7/2011 | Smith | |
| 8,534,044 B2 | 9/2013 | Smith | |
| 8,864,448 B2 * | 10/2014 | Taneja | B64D 41/007 415/122.1 |
| 9,127,648 B2 * | 9/2015 | Sabhapathy | F03D 80/60 |
| 9,197,115 B2 * | 11/2015 | Kubes | H02K 9/193 |
| 9,518,505 B2 * | 12/2016 | Matthews | F02B 37/00 |
| 10,008,908 B2 * | 6/2018 | Hanumalagutti | H02K 9/19 |
| 10,093,147 B2 * | 10/2018 | Bidner | B60H 1/00271 |
| 10,124,647 B2 * | 11/2018 | Bidner | B60H 1/00271 |
| 2003/0145619 A1 * | 8/2003 | Word | F28D 5/00 62/310 |
| 2005/0235672 A1 * | 10/2005 | Hsu | H02K 5/20 62/259.2 |
| 2006/0054146 A1 * | 3/2006 | Ozawa | F02B 33/34 123/559.1 |
| 2006/0060170 A1 * | 3/2006 | Ozawa | F01D 25/20 123/559.1 |

(Continued)

*Primary Examiner* — Pedro J Cuevas
(74) *Attorney, Agent, or Firm* — McGarry Bair PC (57) ABSTRACT

A generator includes a housing, a rotor within the housing and rotatable about an axis of rotation, and a coolant sump within the housing and arranged axially parallel with the axis of rotation, wherein an aeroline of the generator can at least partially limit an aeroline of an engine cowling.

20 Claims, 5 Drawing Sheets

(56) References Cited

U.S. PATENT DOCUMENTS

| | | | |
|---|---|---|---|
| 2007/0101746 A1* | 5/2007 | Schlom | F24F 5/0007 |
| | | | 62/310 |
| 2009/0212156 A1 | 8/2009 | Blumer | |
| 2012/0269625 A1* | 10/2012 | Sabhapathy | F03D 80/80 |
| | | | 416/1 |
| 2013/0043747 A1* | 2/2013 | Kubes | H02K 9/19 |
| | | | 310/54 |
| 2013/0071232 A1* | 3/2013 | Taneja | B64D 41/007 |
| | | | 415/122.1 |
| 2013/0214624 A1* | 8/2013 | Kubes | H02K 9/193 |
| | | | 310/54 |
| 2014/0157773 A1* | 6/2014 | Matthews | F02B 37/00 |
| | | | 60/605.3 |
| 2017/0241343 A1 | 8/2017 | Manteiga et al. | |
| 2017/0244306 A1* | 8/2017 | Lin | H02K 9/20 |
| 2018/0026504 A1* | 1/2018 | Huang | H02K 5/20 |
| 2018/0086174 A1* | 3/2018 | Bidner | B60H 1/00271 |
| 2018/0086175 A1* | 3/2018 | Bidner | B60H 1/00271 |
| 2018/0087450 A1* | 3/2018 | Karnik | B60H 1/3208 |
| 2018/0087451 A1* | 3/2018 | Bidner | F02B 29/0493 |
| 2018/0087452 A1* | 3/2018 | Bidner | B60H 1/3208 |
| 2018/0097424 A1* | 4/2018 | Huang | H02K 3/345 |
| 2018/0278125 A1* | 9/2018 | Huang | H02K 7/20 |
| 2018/0278127 A1* | 9/2018 | Huang | H02K 9/197 |
| 2018/0342919 A1* | 11/2018 | Huang | H02K 3/22 |

\* cited by examiner

METHOD AND ASSEMBLY OF AN ELECTRIC MACHINE

BACKGROUND OF THE INVENTION

Contemporary aircraft engines include electric machine assemblies, or generator systems, which utilize a running aircraft engine in a generator mode to provide electrical energy to power systems and components on the aircraft. Some aircraft engines can further include starter/generator (S/G) systems or motor/generator (M/G), which act as a motor to start an aircraft engine from its high pressure spool or a motor to drive the engine from its low pressure spool, and as a generator to provide electrical energy to power systems on the aircraft after the engine is running. Motors and generators can be wet cavity systems, wherein a cavity housing the rotor and stator is exposed to liquid coolant, or dry cavity systems, wherein the cavity is not exposed to liquid coolant. Dry cavity cooling can also utilize liquid coolant in one or more contained cooling systems, but they are still considered dry cavity so long as the cavity is not exposed to liquid coolant.

BRIEF DESCRIPTION OF THE INVENTION

In one aspect, aspects of the disclosure relate to a generator including a housing, a rotor within the housing and rotatable about an axis of rotation, and a set of coolant sumps within the housing and arranged axially parallel with the axis of rotation. The set of coolant sumps is configured to minimize an aeroline dimension of the generator.

In another aspect, aspects of the disclosure relate to a turbine engine assembly including a turbofan engine, an engine cowling arranged exteriorly to the turbofan engine, and a generator fixed relative to the turbofan engine, within the engine cowling. The generator can further include a generator housing, a rotor within the generator housing, rotatable about an axis of rotation, and mechanically driven by the turbofan engine, and a set of coolant sumps within the generator housing and arranged axially parallel with the axis of rotation. The set of coolant sumps is configured to minimize an aeroline dimension of the generator, and an aeroline of the engine cowling is limited by the aeroline dimension of the generator housing.

In yet another aspect, aspects of the disclosure relate to a generator including a housing, a rotor within the housing and rotatable about an axis of rotation, and a set of coolant sumps within the housing and arranged axially parallel with the axis of rotation. The set of coolant sumps is configured to minimize an aeroline dimension of the generator.

DESCRIPTION OF EMBODIMENTS OF THE INVENTION

Aspects of the disclosure can be implemented in any environment using an electric generator or motor regardless of whether the electric generator or motor provides a driving force or generates electricity. For purposes of this description, such an electric motor will be generally referred to as an electric machine, electric machine assembly, generator, or similar language, which is meant to clarify that one or more stator/rotor combinations can be included in the machine.

While "a set of" various elements will be described, it will be understood that "a set" can include any number of the respective elements, including only one element. As used herein, the terms "axial" or "axially" refer to a dimension along a longitudinal axis of an electric machine or along a longitudinal axis of a component disposed within the electric machine. As used herein, the terms "radial" or "radially" refer to a dimension extending between a center longitudinal axis of the electric machine, an outer rotational circumference, or a circular or annular component disposed within the electric machine. The use of the terms "proximal" or "proximally," either by themselves or in conjunction with the terms "radial" or "radially," refers to moving in a direction toward the center longitudinal axis, or a component being relatively closer to the center longitudinal axis as compared to another component.

All directional references (e. g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e. g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

While this description is primarily directed toward an electric machine providing power generation, it is also applicable to an electric machine providing a driving force or an electric machine providing both a driving force and power generation. Further, while this description is primarily directed toward an aircraft environment or a turbine engine assembly environment, aspects of the disclosure are applicable in any environment using an electric machine. Thus, a brief summary of a contemplated environment should aid in a more complete understanding.

Figure 1:
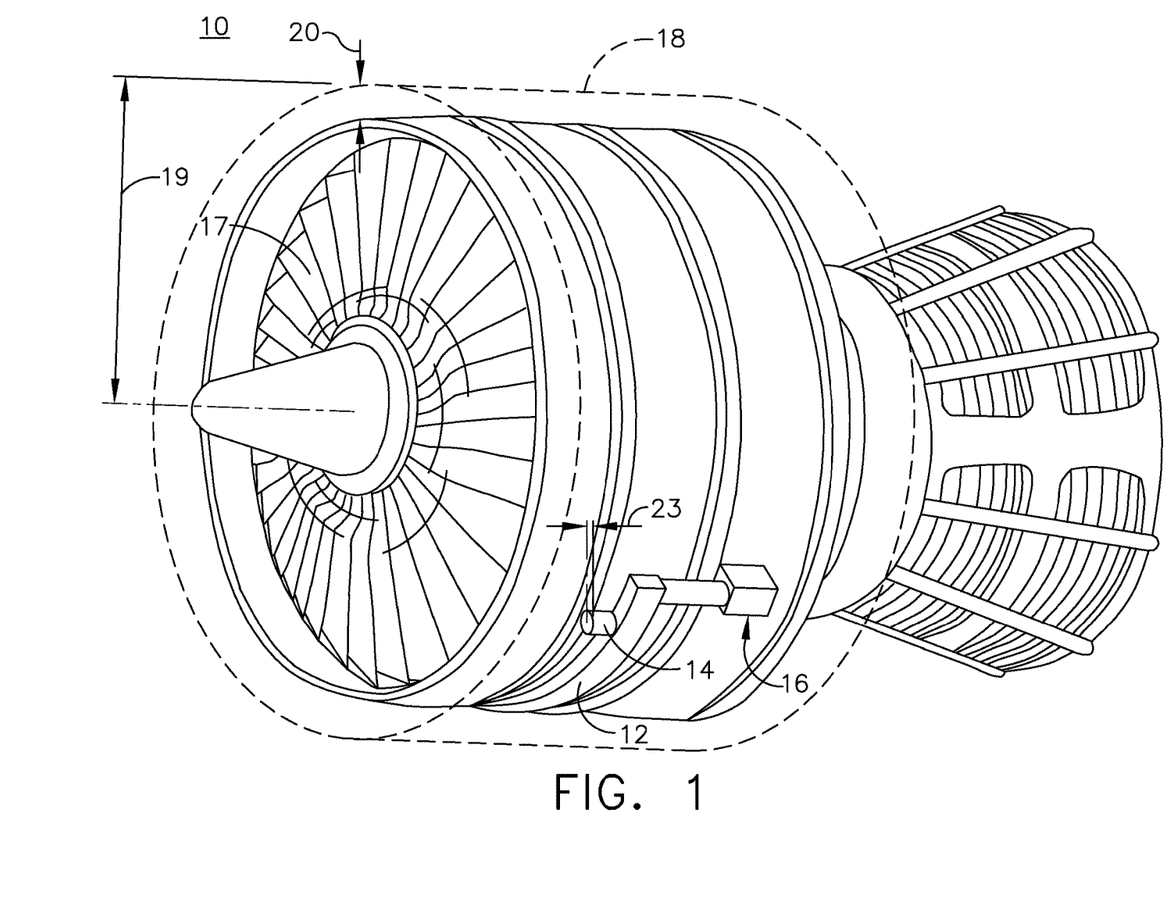
FIG. 1 is a perspective view of a gas turbine engine having a generator located with an engine cowling, in accordance with various aspects described herein.

FIG. 1 illustrates a gas turbine engine assembly 10 having an gas turbine engine 17 and an accessory gear box (AGB) 12 and a generator 14 mounted to the exterior of the turbofan engine 17, according to an aspect of the disclosure. The gas turbine engine 17 can be a turbofan engine, such as a General Electric GEnx or CF6 series engine, commonly used in modern commercial and military aviation or it could be a variety of other known gas turbine engines such as a turboprop or turboshaft. The AGB 12 can be coupled to a turbine shaft (not shown) of the gas turbine engine 17 by way of a mechanical power take off 16. The gas turbine engine 17 can be any suitable gas turbine engine used in modern commercial and military aviation or it could be a variety of other known gas turbine engines such as a turboprop or turboshaft. The type and specifics of the gas turbine engine 17 are not germane to the disclosure and will not be described further herein.

The gas turbine engine assembly 10 can further include an engine cowling 18 (schematically illustrated in dotted line) arranged exteriorly to the gas turbine engine 17, or configured, adapted, contoured, shaped, or the like to encase, envelope, encapsulate, or otherwise radially contain at least a portion of the gas turbine engine 17, as well as the AGB 12, the generator 14, and the mechanical power take off 16. In one non-limiting aspect, the engine cowling 18 can further include a portion of a nacelle, and can be shaped, contoured, dimensioned, or otherwise adapted to reduce aerodynamic drag or to improve aerodynamic performance, or to effectively or operably streamline radial aircraft engines. In one non-limiting example, the engine cowling 18 can include an aeroline dimension (hereafter, "cowling aeroline"). In the context used herein, an aeroline dimension is any dimension of a structure that faces an airstream moving over the structure so as to affect drag in the airstream. For Example, a surface, a geometric plane or an area intersecting the geometric plane, such as a front-facing contoured fairing (relative to the direction of engine intake or aircraft movement), or the like may define an aeroline dimension. In one non-limiting example, an engine aeroline 19 can include a radial dimension of the engine 17, extending from the radial center of the gas turbine engine 17 to the outer radius of the engine cowling 18. In another non-limiting example, a cowling aeroline 20, which can include a portion of the engine aeroline 19, is illustrated as a radial dimension or radial thickness of only the engine cowling 18, extending from an outer radius of the gas turbine engine 17 or an inner radius of the engine cowling 18, to the outer radius of the engine cowling 18.

Regardless of the referential dimension defining the cowling aeroline 20, in one non-limiting instance, the cowling aeroline 20 can be dimensionally limited by one or more components contained, arranged, fixed, or disposed external to the gas turbine engine 17 and encased or encapsulated by the engine cowling 18, such as the generator 14. In this sense, the generator 14 can also include an aeroline dimension (hereafter, "generator aeroline"). As shown, a generator dimension or aeroline can include a radial dimension of the generator 14, relative to an axis of rotation of the rotor in the generator 14. For example, the generator dimension or aeroline 23 is illustrated as a radial dimension of the generator 14 extending between a radial center of the generator 14 an outermost radially distal portion of the generator 14. While the term "aeroline" is used to describe the generator 14 aeroline, it will be understood that the generator 14 is not directly exposed to an airstream during flight operations, and the "aeroline" refers to the dimensional characteristics of the generator 14, not direct airstream-interactive characteristics. Regardless of the referential dimension defining the generator aeroline 23, in one non-limiting instance, the cowling aeroline 20 can be dimensionally limited by the generator aeroline 23.

While a generator 14 is shown and described, aspects of the disclosure can include any electrical machine, generator, motor, starter/generator, of combination there, and are not limited to generator aspects that can provide electrical power. For instance, in one non-limiting example, a generator can operate in a power generation mode to provide power, or in a motor mode, wherein power is consumed to generate rotational force, such as propulsion. Non-limiting examples of the generator 14 can include synchronous machine architectures.

Figure 2:
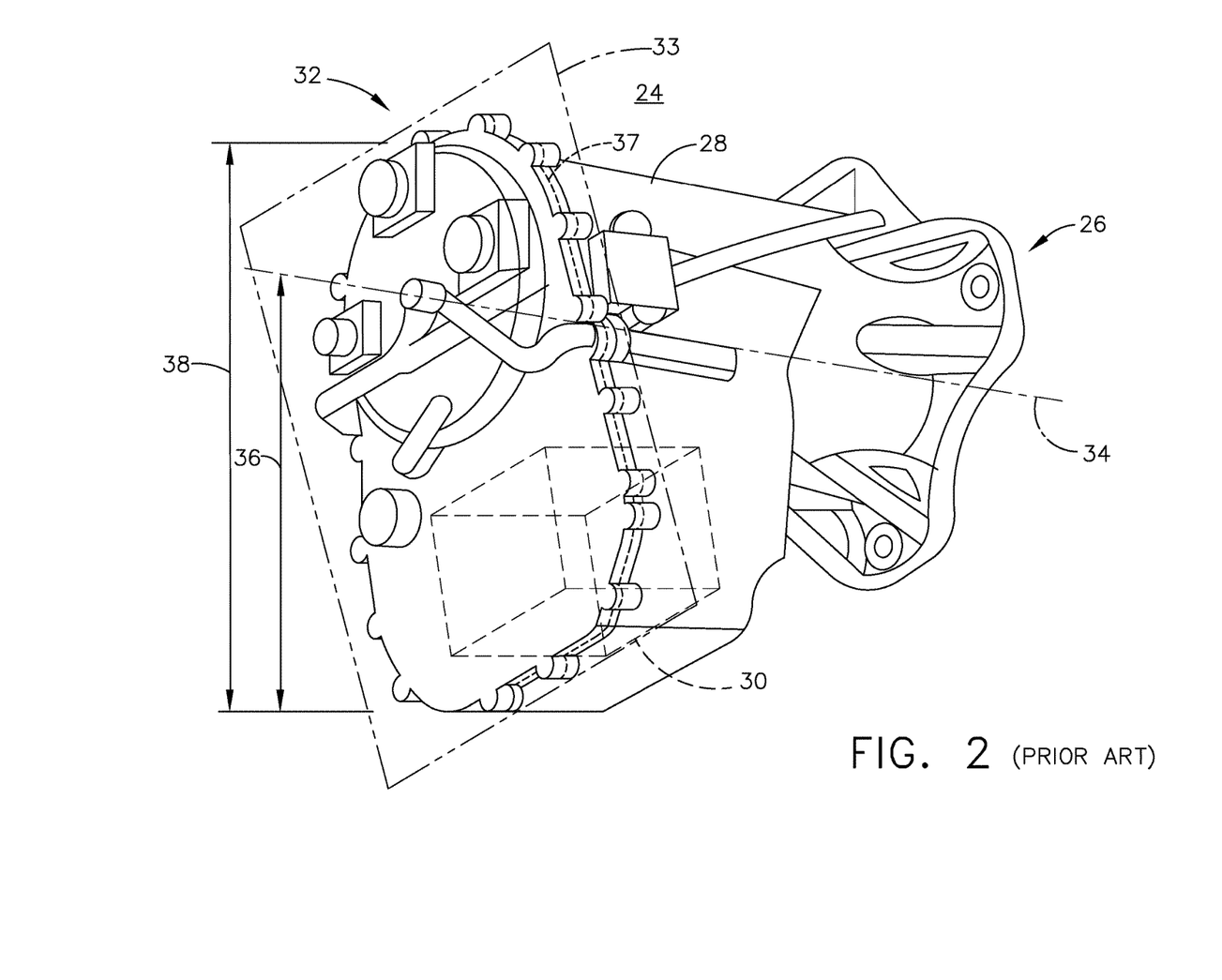
FIG. 2 is an isometric view of an exterior of a prior art generator.

FIG. 2 illustrates a typical dry cavity generator 24 known in the prior art. As shown, the dry cavity generator 24 can include a generator housing 28 and an axis of rotation 34, about which a rotor assembly will rotate relative to a stator assembly to generate electrical power (not shown). The dry cavity generator 24 can further include a clamping interface 26 used to clamp the generator 24 to the AGB 12, and a single, large coolant sump 30 (illustrated schematically) to hold, contain, or otherwise house a coolant, such as cooling oil. The coolant can be supplied to a cooling system for cooling aspects of the dry cavity generator 24 during generator 24 operations.

The prior art dry cavity generator 24 can include a front-facing area 32 of the generator 24 defining an aeroline dimension. In one non-limiting example, the generator 24 aeroline dimension can include a first aeroline dimension 36 defined by a radial distance measured between the axis of rotation 34 and the most radially distal point of the generator 24 or housing 28. In another non-limiting example, the generator 24 aeroline dimension can include a second aeroline dimension 38, defined by the most distal generator 24 or housing 28 opposing points (e.g. the front-facing generator 24 or housing 28 component outer surfaces spaced the furthest from each other, as viewed axially or along the axis of rotation 34, or as measured in a planar dimension normal to the axis of rotation 58). In another non-limiting example, the second aeroline dimension 38 can be defined by the most distal opposing points in a dimension extending through the axis of rotation 34, or can be defined by the absolute most distal opposing points in a dimension without regard to the axis of rotation.

In yet another non-limiting example, the generator 24 aeroline dimension can include a third aeroline dimension 37, defined by a front-facing area 32 of the generator 24 intersecting a first plane 33 normal to the axis of rotation 34, wherein the third aeroline dimension 37 is the largest front-facing area of the generator 24. In one non-limiting example, the third aeroline dimension 37 will be defined by the outer surface of the generator 24 or housing 28 having the largest front-facing area, and may not necessarily include the front face 32 of the generator 24. In the example illustration shown, the third aeroline dimension 37 is represented by a dotted line 37 showing the intersection of the first plane 33 and the most distal portions of the generator 24 or housing 28 intersecting the first plane 33. In another non-limiting example, the third aeroline dimension 37 can include the largest front-facing area, when viewed axially in the direction of the axis of rotation 34, which can be defined by a set of surfaces intersecting a set of planes 33 normal to the axis of rotation 34.

In each of the aforementioned aeroline dimensions 36, 37, 38 described, the maximum aeroline dimension will typically fall at, toward, proximate to, or near the front-facing area 32 of the generator 24. This is at least partially due to the inclusion of a single, large coolant sump 30 increase the front or forward-facing aeroline dimensions 36, 37, 38. Stated another way, the configuration of the larger, single coolant sump 30 increases the typical aeroline dimension 36, 37, 38 (regardless of the method of establishing one of several example measurable aeroline dimensions, as explained herein), compared with a generator housing not having a larger, single coolant sump. The configuration of the larger, single coolant sump 30 can thus further increase the cowling aeroline 20 dimensional configuration, design, limitations, or requirements, as previously described, as the cowling aeroline 20 may further be increased due to the generator aeroline dimension 36, 37, 38.

Figure 3:
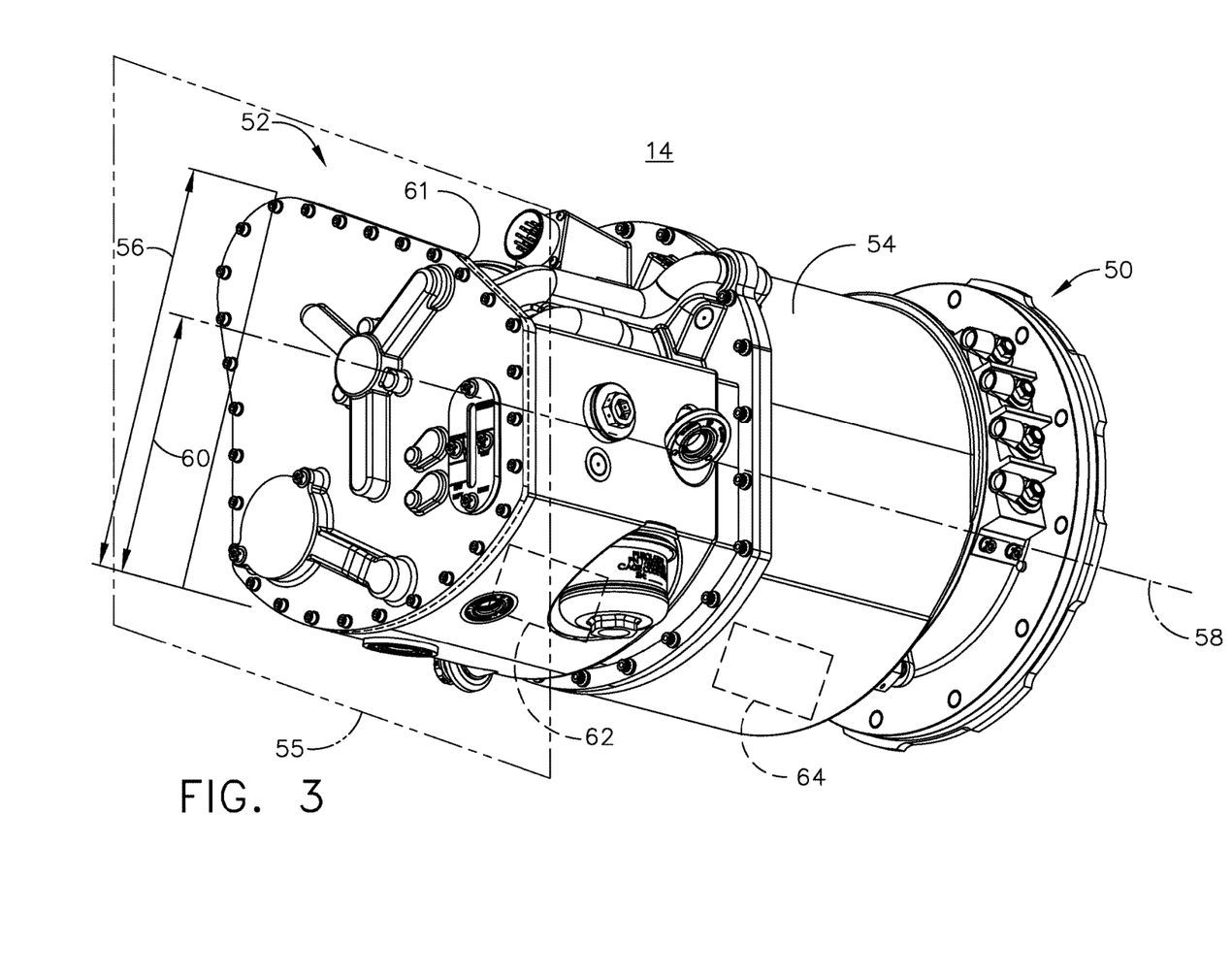
FIG. 3 is an isometric view of a generator of FIG. 1, in accordance with various aspects described herein.

Turning now to FIG. 3, a dry cavity generator 14 in accordance with aspects of the disclosure, is illustrated. As shown, the generator 14 can include a generator housing 54 and an axis of rotation 58, about which a rotor assembly will rotate relative to a stator assembly to generate electrical power (not shown). The dry cavity generator 14 can further include a clamping interface 50 used to clamp or affix the generator 14 to the AGB 12, and a set of coolant sumps, illustrated schematically as a first coolant sump 62 and a second coolant sump 64. The set of coolant sumps 62, 64 are adapted, configured, or the like to hold, contain, or otherwise house a coolant, such as cooling oil. In one non-limiting aspect, each of the coolant sumps 62, 64 are sized, shaped, adapted, or otherwise configured to hold a smaller volume, quantity, or amount of fluid coolant, compared with the coolant sump 30 of FIG. 2. In another non-limiting aspect, the set of coolant sumps 62, 64 can be arranged axially, that is, in parallel with the axis of rotation 58. In another non-limiting aspect, the set of coolant sumps 62, 64 can be fluidly connected by way of a set of fluid passages (not shown).

The coolant can be supplied to a cooling system for cooling aspects of the dry cavity generator 14 during generator 14 operations. Fluid coolant, such as cooling oil, is merely one non-limiting example of a liquid coolant that can be used in aspects of the disclosure. Additional or alternative types of fluid coolant can be included in aspects of the disclosure, including but not limited to, liquids, gases, fluids, or a combination thereof.

The generator 14 can include a front-facing area 52 of the generator 14 defining an aeroline dimension. In one non-limiting example, the generator 14 aeroline dimension can include a first aeroline dimension 60 defined by a radial distance measured between the axis of rotation 58 and the most radially distal point of the generator 14 or housing 54. In another non-limiting example, the generator 14 aeroline dimension can include a second aeroline dimension 56, defined by the most distal generator 14 or housing 54 opposing points (e.g. the front-facing generator 14 or housing 54 component outer surfaces spaced the furthest from each other, as viewed axially or along the axis of rotation 58, or as measured in a planar dimension normal to the axis of rotation 58). In another non-limiting example, the second aeroline dimension 56 can be defined by the most distal opposing points in a dimension extending through the axis of rotation 58, or can be defined by the most distal opposing points in a dimension without regard to the axis of rotation.

In yet another non-limiting example, the generator 14 aeroline dimension can include a third aeroline dimension 61, defined by a front-facing area of the generator 14 intersecting a second plane 55 normal to the axis of rotation 58, wherein the third aeroline dimension 61 is the largest front-facing area of the generator 14. In one non-limiting example, the third aeroline dimension 61 will be defined by the outer surface of the generator 14 or housing 54 having the largest front-facing area, and may not necessarily include the front face 52 of the generator 14. In the example illustration shown, the third aeroline dimension 61 is represented by a dotted line showing the intersection of the second plane 55 and the most distal portions of the generator 14 or housing 54 intersecting the second plane 55. In another non-limiting example, the third aeroline dimension 61 can include the largest front-facing area, when viewed axially in the direction of the axis of rotation 58, which can be defined by a set of surfaces intersecting a set of planes 55 normal to the axis of rotation 58.

In each of the aforementioned aeroline dimensions 56, 60, 61 described, the maximum aeroline dimension will typically fall at, toward, proximate to, or near the front-facing area 52 of the generator 14. In another aspect, at least one of the aeroline dimensions 56, 60, 61 can include at least a partial dimension of another axially-spaced component, such as the clamping interface 50. Regardless of the particular aeroline dimension 56, 60, 61 measured, determined, or utilized, aspects of the generator 14 will have a smaller, lesser, or reduced value of aeroline dimension 56, 60, 61 compared with the generator 24. This is at least partially due to the axially-arranged set of sumps 62, 64 spreading the fluid coolant or fluid coolant volume over an axial distance of the generator 14, as opposed to grouping the fluid coolant in a single, larger coolant sump 30. As used herein, "reduced" means smaller, dimensionally shorter, a smaller area, or the like. In non-limiting aspects, the aeroline dimension 56, 60, 61 can be reduced by at least 1%, 10%, 20%, or up to 50% of the respective dimension 56, 60, 61, compared with the generator 24. In another non-limiting example, the particular portion of the aeroline dimension 56, 60, 61 due to the configuration of the set of axially-arranged set of sumps 62, 64 can be reduced by 50%, 60%, or up to 70%, compared with the generator 24. Thus, the configuration of the set of axially-arranged coolant sumps 62, 64 can thus reduce the cowling aeroline 20 dimensional configuration, design, limitations, or requirements, as previously described.

Figure 4:
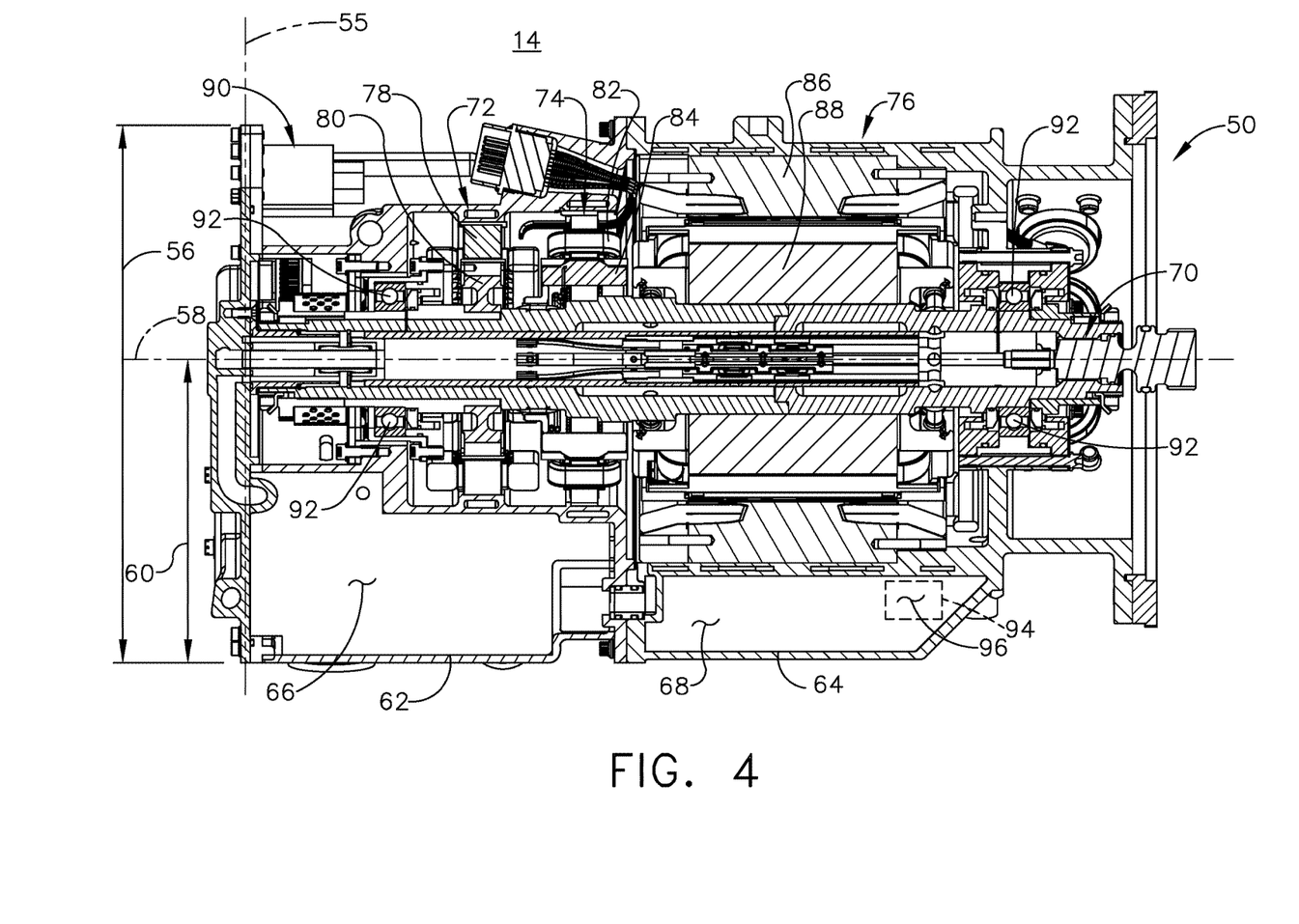
FIG. 4 is a cross-sectional view of the generator of FIG. 3 and illustrating the structure of the generator, in accordance with various aspects described herein.

The interior of the generator 14 is best seen in FIG. 4, which is a first sectional view of the generator 14 shown in FIG. 3. A rotatable shaft 70 is located within the generator 14 and is the primary structure for supporting a variety of components. The rotatable shaft 70 can have a single diameter or one that can vary along its length. The rotatable shaft 70 is supported by spaced bearings 92 and configured to rotate about the axis of rotation 58. Several of the elements of the generator 14 have a fixed component and a rotating component, with the rotating component being provided on the rotatable shaft 70. Examples of these elements can include a main machine 76, an exciter 74, and a permanent magnet generator (PMG) 72. The corresponding rotating component comprises a main machine rotor 88, an exciter rotor 84, and a PMG rotor 80, respectively, and the corresponding fixed component comprises a main machine stator 88 or stator core, an exciter stator 82, and a PMG stator 78.

In this manner, the main machine rotor 88, exciter rotor 84, and PMG rotor 80 are disposed on, or rotationally supported by the rotatable shaft 70, such as directly by the shaft 70, or indirectly by the shaft 70, by a component thereon. The fixed components, such as the main machine stator 86, the exciter stator 82, or the PMG stator 78 can be mounted to any suitable part of the housing 28, such that relative rotation of the rotor components 80, 84, 88 can electromechanically interact with the respective stator components 78, 82, 86. The main machine stator 86, exciter stator 82, and PMG stator 78 define an interior through which the rotatable shaft 70 extends.

It will be understood that the main machine rotor 88, exciter rotor 84, or PMG rotor 80 can have a set of rotor poles, including, but not limited to two rotor poles, and that the main machine stator 86, exciter stator 82, and PMG stator 78 can have a set of stator teeth or stator poles, including, but not limited to two stator teeth or stator poles. The set of rotor poles can generate a set of magnetic fields relative to the set of stator poles, such that the generator 14 can operate through the interaction of the magnetic fields and current-carrying conductors to generate force or electrical power. The exciter 74 can provide direct current to the main machine 76 and the main machine 76 and PMG 72 can supply AC electrical power when the rotatable shaft 70 rotates.

The components of the generator 14 can be any combination of known generators. For example, the main machine 76 can be either a synchronous or asynchronous generator. In addition to the accessories shown in this aspect, there can be other components that need to be operated for particular applications. For example, in addition to the electromechanical accessories shown, there can be other accessories driven from the same rotatable shaft 70 such as the liquid coolant pump, a fluid compressor, or a hydraulic pump. Additionally, as shown, the generator 14 can include an integrated gearbox 90, for example, to operate accessories.

Also as best seen in FIG. 4, the generator 14 includes the first coolant sump 62 defining a first cavity 66 or volume capacity for fluid coolant. The second coolant sump 64 likewise is shown defining a second cavity 68 or volume capacity for fluid coolant. In one non-limiting example, the first cavity 66 can volumetrically larger than the second cavity 68, vice versa, or the cavities 66, 68 can be volumetrically equal.

Non-limiting aspects of the disclosure can also be included wherein at least one of the first coolant sump 62 or second coolant sump 64 further includes a fluidly isolated or fluidly separated third coolant sump 94, such as a scavenge sump, defining a third cavity 96 or volume capacity for fluid coolant. While the first coolant sump 62 and the second coolant sump 64 can be fluidly connected by passages (not shown), the third coolant sump 94 can be isolated from either aforementioned sump 62, 64.

Figure 5:
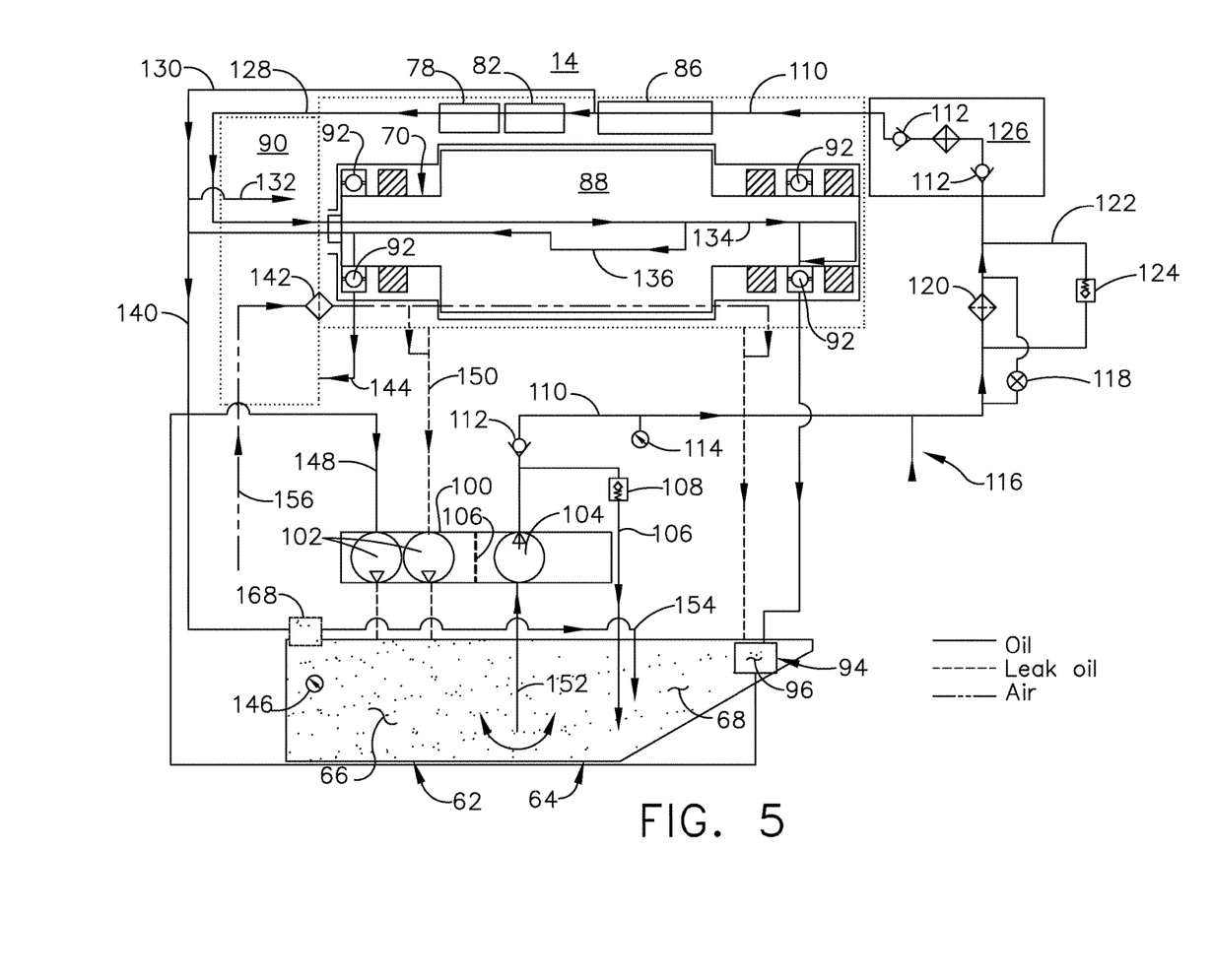
FIG. 5 is a schematic view of the generator, illustrating the cooling system of the generator of FIG. 3, in accordance with various aspects described herein.

FIG. 5 illustrates a schematic view of a set of coolant flow or a cooling system for the generator 14, for ease of understanding. As explained above, the generator 14 can be a dry cavity generator 14, and can thus include a cooling system. The cooling oil can be used to dissipate heat generated by the electrical and mechanical functions of the generator 14. As used in FIG. 5, coolant flow is represented in the direction of flow or travel, by way of flow arrowheads.

In one non-limiting example, coolant can be received from at least one of the first or second coolant sumps 62, 64, by a pump housing 100, by way of a sump outlet 152. The pump housing 100 can include a set of pumps, shown to include a first pump 104 adapted to pump coolant from the set of coolant sumps 62, 64, and a set of second pumps 102 adapted to return coolant to the set of coolant sumps 62, 64. In one non-limiting example configuration, the first pump 104 can be fluidly sealed apart from the set of second pumps 102 by a fluid seal 106. In another non-limiting example, the fluid seal 106 or fluid sealing of the pump housing 100 can prevent backfilling the generator 14 or generator housing 54 with coolant during axial tilting of the generator 14, for example during aircraft climbing or decent.

While the schematic view of FIG. 5 illustrates the pump housing 100 near or proximate to the set of coolant sumps 62, 64, the pump housing 100 can be located on an upper portion of the generator to prevent the pumps 102, 104, or pump housing 100 from being at least partially submersed in the coolant of the set of sumps 62, 64, and can thus minimize the dynamic losses. Further, this arrangement can further prevent the coolant from backfilling the generator, or a cavity thereof. In yet another non-limiting example, the positioning of the pump housing 100 can be removed from either sump 62, 64 to increase the effective fluid capacity of the respective sump or sumps 62, 64 (e.g. no fluid displacement from the pump housing 100).

The first pump 104 can forcibly flow coolant toward a check valve 112 to a first flow 110 received by a coolant filter 120. Non-limiting aspects of the disclosure can be included wherein, for example, a cold start bypass valve 108 leading to a bypass flow 106 can be included upstream of the check valve 112, whereby coolant can be delivered (e.g. via flow 106) back to at least one of the set of coolant sumps 62, 64, as opposed to delivered to the first flow 110. Additionally, in another non-limiting example, the first flow 110 can include a coolant sensor, such as a coolant pressure sensor 114, or a coolant fill port, such as a pressure fill port 116. Non-limiting aspects of the disclosure can be included wherein additional sensors, ports, and the like can be further included or distributed about the generator 14.

The generator 14 can further include a filter differential pressure indicator or filter bypass indicator 118 disposed across the coolant filter 120 to identify a coolant filter 120 clog, blockage, or the like, as well as a coolant filter bypass valve 124 adapted to enable a coolant filter bypass passage 122 when a coolant filter 120 clog is identified.

The first flow 110 can continue through the coolant filter 120 (or bypass 122 thereof) to a heat exchanger device 126, for example, to at least partially cool the coolant. From the heat exchanger device 126, the first flow 110 continues to operably cool a portion of the stator elements. For instance, as shown, the first flow 110 is provided to the main machine stator 86, whereby a thermally conductive relationship between the main machine stator 86 and the first flow 110 removes at least a portion of the heat generated in the stator 86. From the main machine stator 86, the first flow 110 can be distributed between a second flow 128 and a third flow 130, such as a bypass coolant flow.

The second flow 128 delivers a portion of the first flow 110 through the exciter stator 82, the PMG stator 78, or a combination thereof. In this example, a thermally conductive relationship between the exciter stator 82, the PMG stator 78, or a combination thereof, and the second flow 128 removes at least a portion of the heat generated in the respective stators 78, 82. Non-limiting aspects of the disclosure can include further delivering the second flow 128, downstream of the respective stators 78, 82, to the main machine rotor 88 or the rotatable shaft 70. In this sense, a thermally conductive relationship between the main machine rotor 88, the rotatable shaft 70, or a combination thereof, and the second flow 128 removes at least a portion of the heat generated in the main machine rotor 88, the rotatable shaft 70, or a combination thereof.

The second flow 128 can then return from the main machine rotor 88, the rotatable shaft 70, or the like, by way of a fourth flow 136. Alternatively, at least a portion of the second flow 128 can be delivered to a fifth flow 134, which for example, can lubricate or cool the bearings 92. The coolant of the fifth flow 134 can be returned to the main machine rotor 88, the rotatable shaft 70, fourth flow 136, or can flow, for example, as a scavenge coolant flow, to the third coolant sump 94, or a combination thereof. Non-limiting aspects of the disclosure can also being included whereby the fourth flow 136 can lubricate or cool one or more sets of bearings 92, as well. In another non-limiting aspect of the disclosure, the scavenge coolant flow from the set of bearings 92, or any free coolant of the generator 14, can be gathered and supplied to at least one of the set of sumps 62, 64, 94, for example, via gravity feeds, one of the set of second pumps 102, or the like. In another non-limiting example, the scavenge coolant flow from the set of bearings 92, or any free coolant of the generator 14, can be gathered and supplied to another component of the generator, for example, to the gearbox 90 via flow 144, as shown.

The fourth flow 136 and the third flow 130 can be combined fluidly downstream of the rotatable rotor 70, to a sixth flow 140, which can be returned to at least one of the first or second sumps 62, 64, by way of a sump inlet 154, as shown. In one non-limiting aspect of the disclosure, the sixth flow 140 can traverse through a coolant deaerator 168 prior to returning the coolant to at least one of the first or second sumps 62, 64.

In another non-limiting aspect of the disclosure, the gearbox 90 can receive a seventh flow 132 of coolant, for example, from a portion of the third flow 130. The seventh flow 132 can lubricate or cool gears or components of the gearbox 90. In another non-limiting aspect of the disclosure, the gearbox 90 can receive an airflow 156, which in can mix with the seventh flow 132 to create an air/coolant mix. In this example, the air coolant mix can be provided to an air-oil separator 142, which supplies an airflow to a portion of the main machine rotor 88 (or housing or cavity thereof), as well as a leak coolant flow 150 (or set thereof). The leak coolant flow 150 can be supplied to at least one of the first coolant sump 62, the second coolant sump 64, the third coolant sump 94 (e.g. as scavenged coolant), or can be supplied to at least one of the second pumps 102, whereby the leak coolant flow 150 can be pumped back to one of the sumps 62, 64, 94.

Yet another non-limiting aspect of the disclosure can be included wherein, for example, the third coolant sump can be fluidly connected by way of an eighth flow 148 with one of the set of second pumps 102, and adapted such that the second pump 102 forcibly pumps or supplies coolant within the third sump 94 back to at least one of the first or second sumps 62, 64. In this example, the eighth flow 148 can deliver the coolant of the third sump 94 to at least one of the first or second sumps 62, 64 intermittently, or at regular timed intervals. In yet another non-limiting example, at least one of the first or second sumps 62, 64 can further include a coolant level sensor 146 to ensure adequate coolant supply in the set of sumps 62, 64.

The cooling systems can enable or provide dry cavity-based cooling by way of at least the set of coolant flows, or a subset thereof, to thermally transfer heat from the heated components to the cooling liquid, such as cooling oil. The coolant can further be supplied from, and returned to, the axially-aligned set of coolant sumps 62, 64, as described herein. In this sense, the heat generated in the respective components can be conductively transferred to the cooling liquid (i. e. "hot" liquid) of the cooling system, which can be forcibly pumped away from the heat-generating components.

The aforementioned aspects of the disclosure enable or provide a generator 14 having increased or sufficient cooling capabilities utilizing coolant distributed between a set of axially-arranged or oriented coolant sumps 62, 64. By distributing the coolant volume over a set of axially-arranged coolant sumps 62, 64, the generator 14 has a reduced or smaller aeroline dimension, compared with contemporary dry cavity generators. A reduced or smaller aeroline dimension can, in turn, reduce the aeroline of the engine cowling 18, reducing drag and increasing fuel efficiency of an aircraft engine. Non-limiting examples fuel efficiency increases due to the aforementioned disclosure aspects can include ranges between 0.3% and 0.5%. By increasing fuel efficiency of the aircraft engine, the aircraft can operate at higher fuel cost savings and increasing operable flight range for the aircraft.

Another advantage that can be realized in the above aspects is that the above described aspects can provide for a dry cavity generator 14 wherein the system can be designed or operated without, or free of, at least an external liquid cooling jacket such that the system provides cooling greater than or equal to a predetermined level, wherein the predetermined level is based on an external liquid cooling jacket. Alternatively, or in addition to the aforementioned benefit, the above-described aspects enable or provide a generator 14 that operate at a higher power density, or generate increased power levels, without a loss in power-generation efficiency due to undesirable heating.

Yet another advantage of the above described aspects can include increased efficiency with regards to the cooling system. For instance, wet cavity type of cooling is an effective cooling strategy for generators, but is less efficient compared with dry cavity cooling described herein. In another non-limiting example, inefficiencies in wet cavity cooling due to the oil interactions with moving components in the cavity cause significant dynamic losses for the generator. Aspects of the disclosure can provide a construction of dry cavity generators that includes high efficiency cooling and high power density.

Although the above aspects have been described in terms of a generator for a gas turbine engine, the above-described aspects can be used in any electric machine that may be limited by an aeroline dimension. The above-described aspects of the disclosure can be well-suited for certain generator applications, such as a generator positioned proximate to the turbine engine, and thus creating a high temperature and space or volume-limited environment for generator operation.

Many other possible aspects and configurations in addition to that shown in the above figures are contemplated by the present disclosure. For instance, while dual scavenge pumps (i.e. set of second pumps 102) are illustrated, non-limiting aspects of the disclosure can include only a single second pump 102. In another non-limiting aspect, the placement of the third coolant sump 94 within the first or second sump 62, 64 can be modified without changing functionality of the overall generator 14 or cooling system. Additionally, the design and placement of the various components, or coolant flows therebetween, can be rearranged such that a number of different in-line configurations could be realized.

The aspects described above provider for a variety of benefits including that they have higher efficiency, high reliability, less maintenance, all-attitude operation, and lower weight. By attaining increased cooling capabilities for the dry cavity electric machine free of cooling systems external to the machine other than those described herein, the electric machine can eliminate the additional the costs, complexity, weight, and size requirements of the additional cooling systems otherwise needed. The resulting electric machine is lighter, smaller, and has less complexity than conventional dry cavity machines. Lighter, smaller, less complex, increased fuel efficiency, improved cooling capabilities, a higher power density, or a combination thereof, are important in a turbine engine environment and provides a competitive advantage during flight. The reduced complexity can also correspond to reduced maintenance over time, also providing lower operating costs.

To the extent not already described, the different features and structures of the various aspects can be used in combination with others as desired. That one feature cannot be illustrated in some of the aspects is not meant to be construed that it cannot be, but is done for brevity of description. Thus, the various features of the different aspects can be mixed and matched as desired to form new aspects, whether or not the new aspects are expressly described.

This written description uses examples to disclose aspects of the disclosure, including the best mode, and also to enable any person skilled in the art to practice the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A generator comprising:
   a housing;
   a rotor within the housing and rotatable about an axis of rotation; and
   a set of coolant sumps within the housing and arranged axially parallel with the axis of rotation;
   wherein the set of coolant sumps is configured to minimize an aeroline dimension of the generator.

2. The generator of claim 1 wherein the set of coolant sumps includes two axially-arranged coolant sumps.

3. The generator of claim 1 wherein the set of coolant sumps are fluidly connected.

4. The generator of claim 1 wherein the set of coolant sumps further comprises a scavenge sump fluidly separated from the set of coolant sumps.

5. The generator of claim 4 wherein the generator further comprises a dry cavity defined by the housing and bearings supporting the rotor, and wherein the scavenge sump fluidly collects at least one of dry cavity free coolant or bearing coolant.

6. The generator of claim 1 wherein a portion of the aeroline dimension corresponding to the set of coolant sumps is reduced compared with a single coolant sump.

7. The generator of claim 1 wherein the housing includes a forward-facing area defined by the intersection of a plane normal to the axis of rotation and the generator.

8. The generator of claim 1, further comprising a set of coolant pumps disposed on an upper portion of the generator.

9. The generator of claim 8 wherein the generator is a dry cavity generator and wherein the set of coolant pumps are positioned relative to the generator housing to prevent backfilling the generator housing with coolant during axial tilting of the generator.

10. A turbine engine assembly comprising:
    a turbofan engine;
    an engine cowling arranged exteriorly to the turbofan engine; and
    a generator fixed relative to the turbofan engine, within the engine cowling, and further comprising:
    a generator housing;
    a rotor within the generator housing, rotatable about an axis of rotation, and mechanically driven by the turbofan engine; and
    a set of coolant sumps within the generator housing and arranged axially parallel with the axis of rotation;
    wherein the set of coolant sumps is configured to minimize an aeroline dimension of the generator; and
    wherein an aeroline of the engine cowling is limited by the aeroline dimension of the generator housing.

11. The turbine engine assembly of claim 10 wherein the aeroline dimension of the generator is defined by a radial dimension extending between the axis of rotation and the most distal portion of the generator housing.

12. The turbine engine assembly of claim 10 wherein the generator housing includes a forward-facing aeroline dimension area defined by the intersection of a plane normal to the axis of rotation and the generator.

13. The turbine engine assembly of claim 10 wherein the set of coolant sumps includes two axially-arranged coolant sumps.

14. The turbine engine assembly of claim 10 wherein the set of coolant sumps are fluidly connected.

15. The turbine engine assembly of claim 10 wherein the set of coolant sumps further comprises a scavenge sump fluidly separated from the set of coolant sumps.

16. The turbine engine assembly of claim 10 wherein the aeroline dimension of the generator is defined by a diameter dimension extending between opposing radially distal portions of the generator housing.

17. The turbine engine assembly of claim 10 wherein generator is a dry cavity generator and the set of coolant sumps are sealed to prevent backfilling the generator housing with coolant during axial tilting of the turbine engine assembly.

18. A generator comprising:
    a housing;
    a rotor within the housing and rotatable about an axis of rotation; and
    a set of coolant sumps within the housing and arranged axially parallel with the axis of rotation;
    wherein the set of coolant sumps is configured to minimize an aeroline dimension of the generator.

19. The generator of claim 18 wherein the aeroline dimension of the generator is defined by a radial dimension extending between the axis of rotation and the most distal portion of the generator housing.

20. The generator of claim 18 wherein the aeroline dimension of the generator is defined by a diameter dimension extending between opposing radially distal portions of the generator housing.

* * * * *